(12) United States Patent
Alaze et al.

(10) Patent No.: US 6,283,724 B1
(45) Date of Patent: Sep. 4, 2001

(54) PISTON PUMP

(75) Inventors: Norbert Alaze, Markgroeningen; Siegfried Fritsch, Sonthofen; Andreas Weh, Durach, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/419,100

(22) Filed: Oct. 15, 1999

(30) Foreign Application Priority Data

Oct. 15, 1998 (DE) .............................. 198 47 471

(51) Int. Cl.$^7$ .............................. F04B 1/04; F04B 19/00
(52) U.S. Cl. .............................. 417/273; 417/470
(58) Field of Search .................. 417/273, 470, 417/415, 214

(56) References Cited

U.S. PATENT DOCUMENTS

| | | | |
|---|---|---|---|
| 3,597,119 | 8/1971 | Gratzmuller | 417/360 |
| 5,123,819 | * 6/1992 | Schuller et al. | 417/569 |
| 5,125,808 | 6/1992 | Sekiguchi | 417/569 |
| 5,213,482 | * 5/1993 | Reinartz et al. | 417/273 |
| 5,232,273 | 8/1993 | Eckstein | 303/116.4 |
| 5,320,498 | * 6/1994 | Fuchida | 417/214 |
| 5,947,441 | * 9/1999 | Zenker et al. | 251/44 |
| 6,079,961 | * 6/2000 | Schuller et al. | 417/549 |
| 6,126,418 | * 10/2000 | Sinnl | 417/470 |

FOREIGN PATENT DOCUMENTS

| | | |
|---|---|---|
| 19 11 534 A | 9/1970 | (DE) . |
| 41 07 979 A1 | 9/1992 | (DE) . |

* cited by examiner

Primary Examiner—Charles G. Freay
Assistant Examiner—Michael K. Gray
(74) Attorney, Agent, or Firm—Ronald E. Greigg; Edwin E. Greigg

(57) ABSTRACT

A piston pump for a slip-controlled hydraulic vehicle brake system. For the sake of economical production, the piston pump is embodied with a plastic bush and with a needle of a needle bearing as the piston, and that an inlet valve is accommodated in a valve seat part (96) that is inserted into the bush (16). The invention has an advantage that both the inlet valve and an outlet valve can be mounted coaxially on the bush, and that the bush, because of its elasticity since it is made of plastic, brings about a favorable closing performance of the two valves.

11 Claims, 3 Drawing Sheets

PISTON PUMP

BACKGROUND OF THE INVENTION

The invention relates to a piston pump which is intended for use particularly in a slip-controlled hydraulic vehicle brake system.

One such piston pump is known from German patent application DE 41 07 979 A1. The known piston pump has a pump housing, into which a bush is inserted. A piston is axially displaceably received in the bush and can be driven to execute an axially reciprocating stroke motion by mean of an eccentric element that can be driven to rotate by an electric motor. The known piston pump has an inlet valve and an outlet valve that control a flow direction of fluid pumped by the piston pump; in the known piston pump, these valves are embodied as spring-loaded check valves. The outlet valve is disposed on the outlet side of a bush bottom that is integral with the bush. The inlet valve is disposed on a piston face end that is located in the bush and faces toward the bush bottom. The fluid inlet takes place through the piston, which to this end has intersecting transverse bores and is provided with an axial blind bore, beginning at these transverse bores, that leads to a valve seat of the inlet valve.

OBJECT AND SUMMARY OF THE INVENTION

In the piston pump of the invention, both of the valves that control the flow direction are disposed on or in the bush. This has the advantage that geometrically, the piston can take the form of a cylinder and can be produced without any bore, undercut, or the like at all, and hence can be made economically. A roller or needle of a roller or needle bearing can for instance be used as the piston; these parts, being mass-produced, can be procured inexpensively.

Another advantage is that no valve is disposed on the piston; this reduces the mass to be moved when the piston pump is in operation. The opening and closing performance of the valve, which in the invention is stationary inside the bush, is more favorable than a valve mounted on the piston, which necessarily goes along with the reciprocating motion of the piston, thus subjecting a valve closing body to considerable acceleration.

The piston pump of the invention is intended in particular as a pump in a brake system of a vehicle and is used to control the pressure in wheel brake cylinders. Depending on the type of brake system, the abbreviations ABS, TCS, ESP and EHB are used for such brake systems. In the brake system, the pump serves for instance to return brake fluid from one or more wheel brake cylinders to a master cylinder (ABS) and/or to pump brake fluid out of a supply container into one or more wheel brake cylinders (TCS or ESP or EHB). The pump is needed for instance in a brake system with wheel slip control (ABS or TCS) and/or a brake system serving as a steering aid (ESP) and/or an electrohydraulic brake system (EHB). With wheel slip control (ABS or TCS), locking of the wheels of the vehicle during a braking event involving strong pressure on the brake pedal (ABS) and/or spinning of the driven wheels of the vehicle in the event of strong pressure on the gas pedal (TCS) can for instance be averted. In a brake system serving as a steering aid (ESP), a brake pressure is built up in one or more wheel brake cylinders independently of an actuation of the brake pedal or gas pedal, for instance to prevent the vehicle from breaking out of the track desired by the driver. The pump can also be used in an electrohydraulic brake system (EHB), in which the pump pumps the brake fluid into the wheel brake cylinder or cylinders if an electric brake pedal sensor detects an actuation of the brake pedal, or in which the pump is used to fill a reservoir of the brake system.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
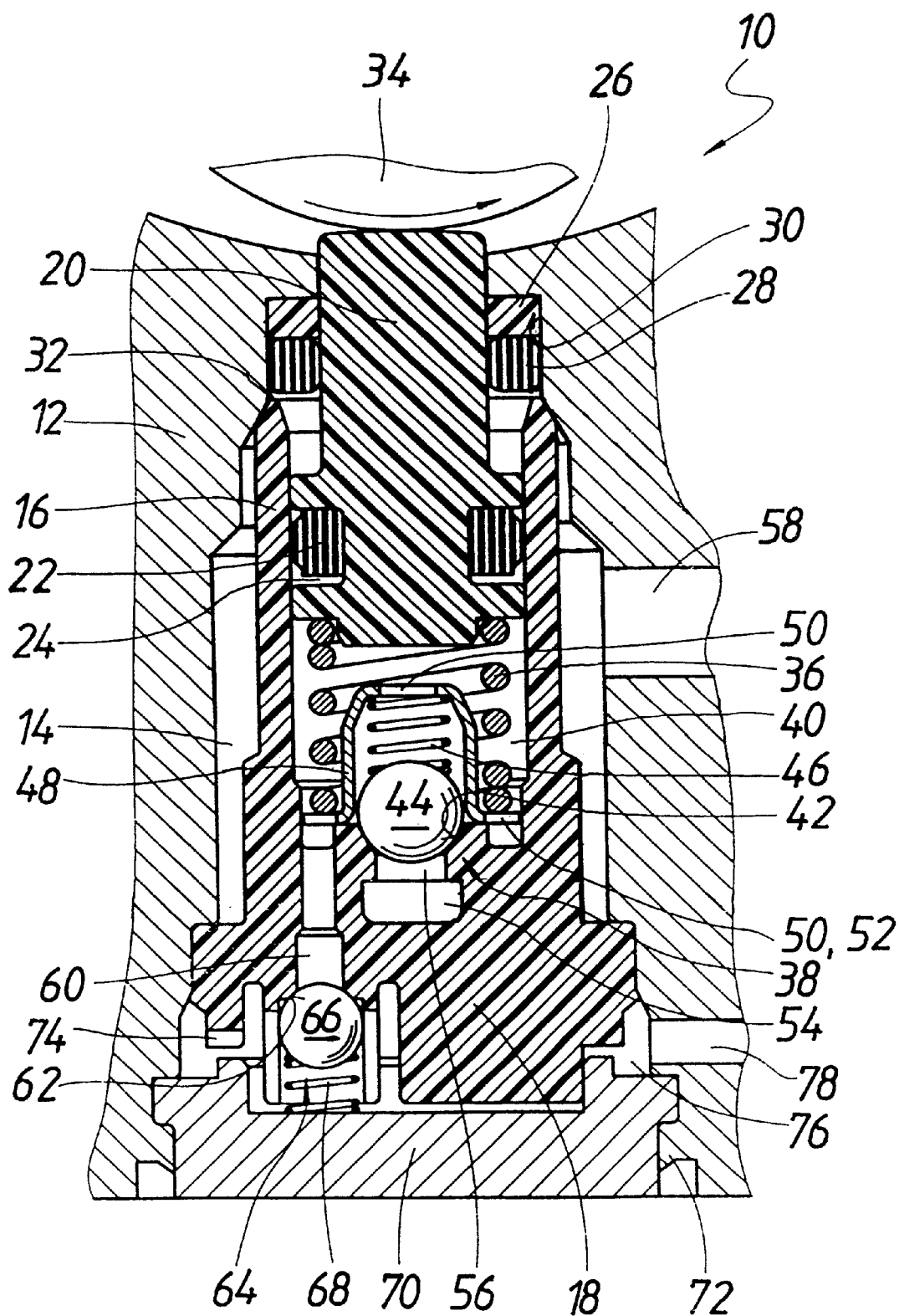
FIG. 1 is an axial section through a first exemplary embodiment of the invention.

The piston pump shown in FIG. 1 and identified overall by reference numeral 10 has a pump housing 12 with a continuous, stepped pump bore 14. The pump housing 12 is of metal, in particular die cast aluminum. The pump housing 12 is part of a hydraulic block, not otherwise shown, of a slip-controlled vehicle brake system. Besides the piston pump 10, other hydraulic components, such as magnet valves, damper chambers, and hydraulic reservoirs, are inserted into the hydraulic block and connected hydraulically with one another and with the piston pump 10. For the sake of clarity in the drawing, FIG. 1 shows only a fragment of the hydraulic block surrounding the piston pump 10.

A hollow-cylindrical bush 16, made as a plastic injection molded part, is inserted into the pump bore 14 and has a bush bottom 18, integral with it, on one face end. The plastic bush 16 has the advantage of providing low-friction guidance for a piston 20 inserted into the bush; there is no need for post-treatment, by grinding, polishing, or the like, of the inside circumferential surface of the bush 16 that guides the piston 10.

A guide ring for guiding the piston 20 in the bush is unnecessary and is not provided. The sliding properties of the bush 16 are improved by the addition of Teflon. Besides Teflon, carbon fibers are added to the plastic that forms the bush 16; they increase the strength of the bush 16 and improve its wear resistance.

The piston 20, received and guided axially displaceably in the bush 16, is also made as an injection molded part of carbon fiber reinforced plastic. The piston 20 is sealed off in the bush 16 by a sealing ring 22, which is placed in a piston groove 24. On an end protruding from the bush 16, the piston 20 is guided in the pump housing 12 by a plastic guide ring 26 and is sealed off by a rubber sealing ring 28. The guide ring 26 and the sealing ring 28 are placed, one resting on the other, in a shoulder 30 of the pump bore 14 and are held in the shoulder 30 of the pump bore 14 by an end edge 32, facing them, on the open end of the bush 16.

For driving the piston 20 to execute a reciprocating stroke motion in the axial direction of the pump bore 14 and the bush 16, the piston pump 10 has an eccentric element 34, which can be driven to rotate by an electric motor, on the side of the piston 20 that protrudes form the bush 16; the piston 20 is pressed against the circumference of this eccentric element by a piston restoring spring 36, embodied as a helical compression spring, that is inserted into the bush 16 between the bush bottom 18 and the piston 20.

As its inlet valve 38, the piston pump 10 of the invention has a spring-loaded check valve. The inlet valve 38 is accommodated between the piston 20 and the bush bottom 18 in the bush 16, and thus in a positive-displacement chamber or work chamber 40 of the piston pump 10. A conically embodied valve seat 42 of the inlet valve 38 is embodied coaxially with the bush bottom 18, on a side toward the piston 20. As its valve closing body, the piston pump 10 of the invention has a valve ball 44, which is pressed against the valve seat 42 by a valve closing spring 46 embodied as a helical compression spring. The valve closing spring 46 is braced against a cup-shaped valve cage 48, which is made as a stamped and deep-drawn sheet-metal part and is provided with flow openings 50 for brake fluid that is to be pumped by the piston pump 10. The valve cage 48 has a radially outward-protruding, annular-disklike spring plate 52, which is integrally formed on in the deep-drawing process; the piston restoring spring 36 is braced on this spring plate 52, and there the piston restoring spring 36 presses the valve cage 48 against the bush bottom 18. The piston restoring spring 36 is made substantially stronger than the valve closing spring 46 of the inlet valve 38, and thus under all the loads occurring during operation of the piston pump 10 the spring 36 keeps the valve cage 48 reliably in contact with the bush bottom 18, counter to the force of the valve closing spring 46.

For the admission of brake fluid to be pumped, an inlet conduit 54 is provided continuously and transversely through the bush bottom 18; from this conduit, a short axial hole 56 leads to the valve seat 42. The inlet conduit 54 communicates on both ends with the pump bore 14 that surrounds the bush 16, and an inlet bore 58 mounted in the pump housing 12 radially to the pump bore 14 discharges into the pump bore 14.

For letting brake fluid out of the positive-displacement chamber 40, the piston pump 10 has an outlet passage 60, which passes through the bush bottom 18 axially parallel to the bush 16 and laterally beside the inlet valve 38, the axial hole 56, and the inlet conduit 54 that passes transversely through the bush bottom 18. The mouth of the outlet hole 60 is a conical valve seat 62 of an outlet valve 64, which is mounted on the outside of a face end of the bush bottom 18. The outlet valve 64 is embodied as a spring-loaded check valve; the outlet valve has a valve ball 66 as its valve closing body, which is pressed against the valve seat 62 by a helical compression spring, as the valve closing spring 68.

The valve closing spring 68 of the outlet valve 64 is braced against a closure cap 70, which closes the pump bore 14 on a side remote from the eccentric element 34. The closure cap 70 is retained and sealed off in pressure-tight fashion by an encompassing calking 72 of the pump housing 12.

Because of the greater elasticity of plastic in comparison with metal, the plastic valve seats 42, 62 are tighter, if there is a slight pressure difference between the outflow and inflow sides of the respective valve 38, 64, than valve seats of metal; this makes for greater efficiency of the piston pump 10. Another advantage is the simplicity of production of the valve seats 42, 64 in the injection molding of the bush 16 without an additional work step; postmachining of the valve seats 42, 62 is unnecessary. There are also fewer parts, because the two valve seats 42, 62 are embodied integrally on the bush bottom 16.

By means of a radial conduit 74 between the bush bottom 18 and the closure cap 70, brake fluid flowing out of the piston pump 10 through the outlet valve 64 enters an annular conduit 76, which surrounds the bush bottom 18 and is enclosed by the bush bottom 18, pump housing 12 and closure cap 70, and from which the brake fluid flows out of the piston pump 10 through an outlet bore 78, which is mounted radially in the pump housing 12.

DESCRIPTION OF THE SECOND EXEMPLARY EMBODIMENT

Figure 2:
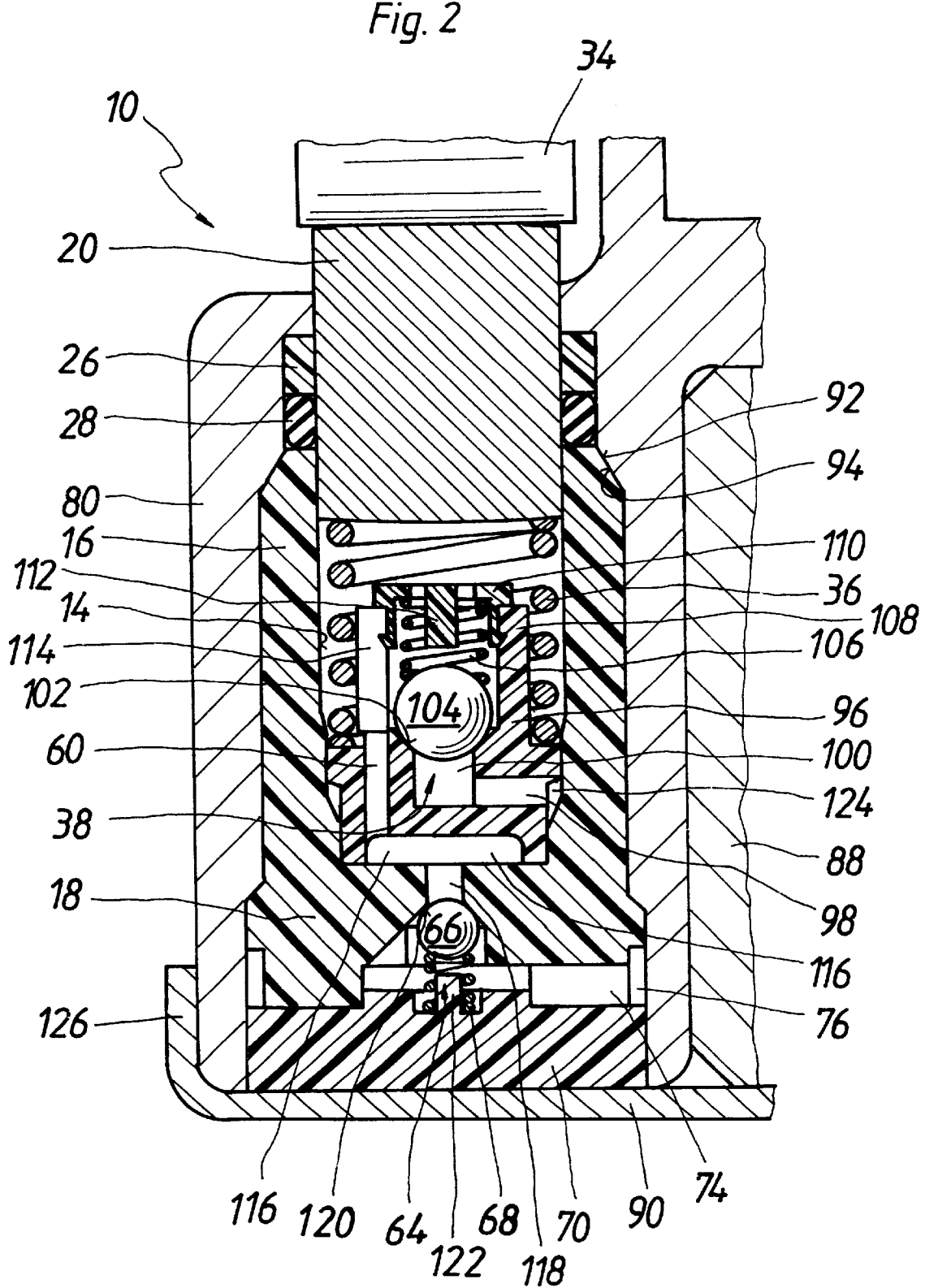
FIG. 2 is an axial section through a second exemplary embodiment of the invention.
Figure 3:
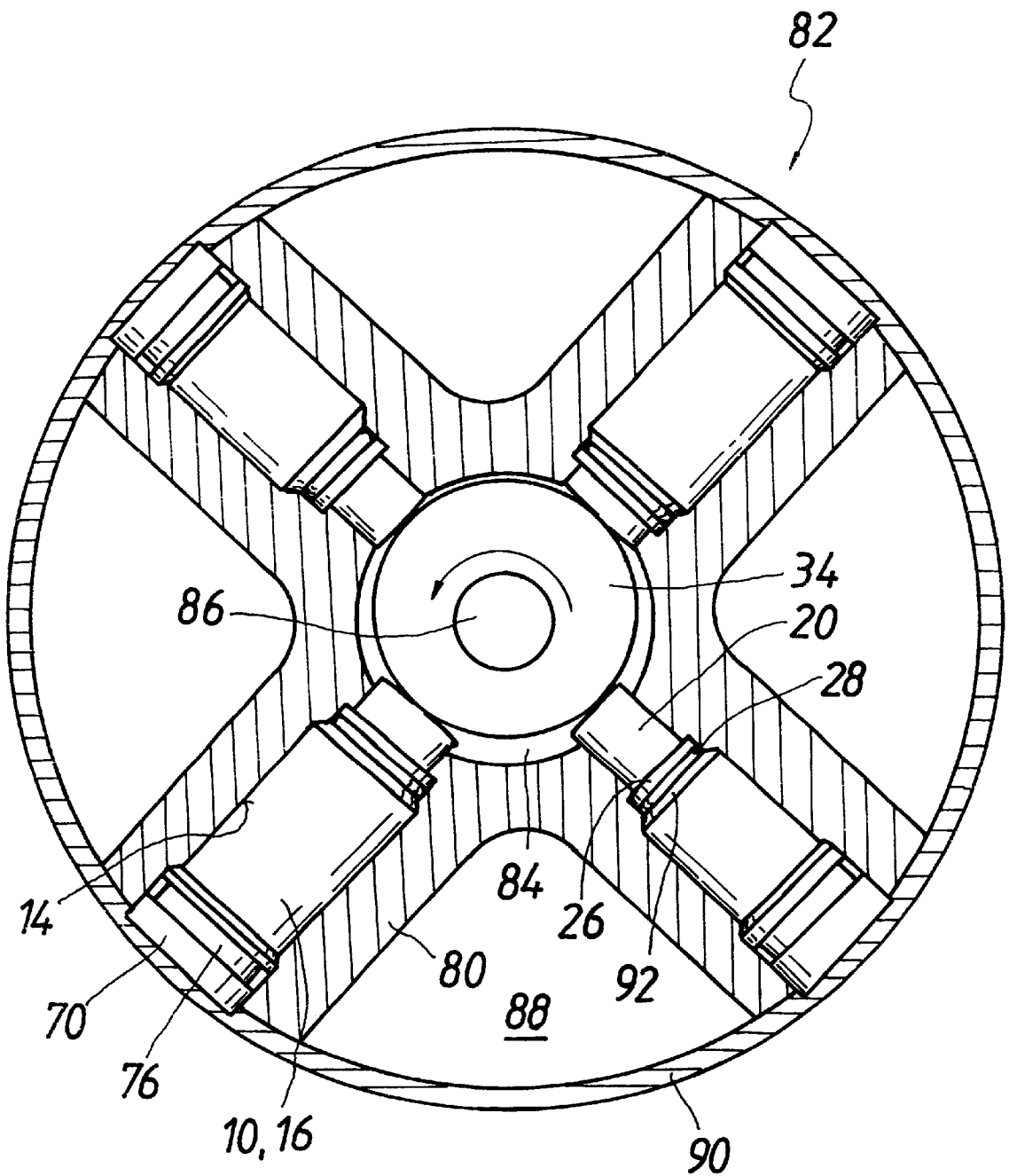
FIG. 3 shows a four-piston pump according to the invention.

For describing the piston pumps shown in FIGS. 2 and 3, the same reference numerals as in FIG. 1 will be used for identical components. The piston pump 10 shown in FIG. 2 has a bush 16, which has an integral bush bottom 18 and is inserted into a pump bore 14 in a pump housing 12. The bush 16 is made by injection molding, from a plastic to which carbon fibers for increasing the strength and Teflon components for improving the sliding properties of the piston 20 have been added.

The piston pump 10 is inserted in one arm of a cross-shaped pump housing 30 (see FIG. 3). One piston pump 10 (pump element) is inserted into each of the four arms of the cross-shaped pump housing 80, so that the total of four piston pumps 10 form a pump unit 82 with piston pumps 10 arranged in a star pattern. In the center, the star-shaped pump housing 80 has a cylindrical eccentric element chamber 84, in which the eccentric element 34 is accommodated. The eccentric element 34 is a circular disk with an eccentrically made bore, with which the eccentric element 34 is press-fitted onto a motor shaft 86 of an electric pump motor. The only parts of the pump motor that are visible in FIGS. 2 and 3 are an end wall 88 and a pole tube 80, which are both part of the motor housing. The cross-shaped pump housing 80 is mounted on the end wall 88 of the pump motor.

The piston 20 of the piston pump 10 shown in FIG. 2 is a solid cylinder, for instance of metal (steel), without any undercut, bore or the like whatever. The piston 20 can thus be produced inexpensively. In particular, a needle or roller of a needle or roller bearing can be used as the piston 20. Such needles or rollers can be procured at favorable cost because they are mass-produced parts.

The piston 20 is guided with a guide ring 26 in the pump housing 12 and is sealed off in the pump housing 12 with a sealing ring 28. On its open face end, the bush 16 has a conical sealing face 92, with which the bush rests sealingly on a complementary sealing seat 94 of the pump bore 14 of the pump housing 12. In this way, the bush 16 is sealed off on its open face end, toward the eccentric element, in the pump housing 80. As a result, sealing of f the piston 20 in the bush can be dispensed with.

A piston restoring spring 36 inserted into the bush 16 presses the piston 20 into contact with the circumference of the eccentric element 34. The piston restoring spring 34 is braced indirectly against the bush bottom 18 via a valve seat part 96. The valve seat part 96 is a plastic injection molded part. In one region toward the bush bottom 18, the valve seat part 96 has a transverse hole 98, from which an axial blind bore 100 leads away in the direction of the piston 20 and discharges into a conical valve seat 102. A valve ball 104 as the valve closing body is pressed against the valve seat 102 by a valve closing spring 106. The valve ball 104 and the valve closing spring 106 are received in a hollow-cylindrical collar 108, which surrounds the valve seat 102 and extends in the direction of the piston 20. The collar 108 is closed by a closure clip 110, on which the valve closing spring 106 is braced. In its middle the closure clip 110 has a valve stroke limiter peg 112, which limits a valve stroke of the inlet valve 38, or in other words the maximum distance by which the valve ball 104 can lift away from the valve seat 102. The valve stroke limiter 112 shortens the valve closing time after high throughput and lessens an impact of the valve ball 104 on the valve seat 102 when the inlet valve 38 closes, which reduces the wear of the valve seat 102 and prevents the valve ball 104 from bouncing back from the valve seat 102.

As its outlet, the collar 108 is provided with a longitudinal slot 114, from whose bottom an outlet hole 60, disposed to the side of the blind bore 100, leads to a face end, seated on the bush bottom 18, of the valve seat part 96. A cylindrical countersunk feature 116, into which the outlet hole 60 discharges, is provided in the side of the valve seat part 96 that is seated on the bush bottom 18.

From the countersunk feature 116, a center hole 118 leads through the bush bottom 18 to a coaxial valve seat 120 of an outlet valve 64 of the piston pump 10. The outlet valve 64 has a valve ball 66 as its valve closing body, which is pressed against the valve seat 120 by a valve closing spring 68 embodied as a helical compression spring. The valve closing spring 68 is braced against a closure cap 70, which is inserted sealingly into the pump bore 14. The closure cap 70 has a valve stroke limiter peg 122, integral with it, in the middle of the valve closing spring 58. Brake fluid flowing out of the piston pump 10 through the outlet valve 64 passes through a radial conduit 74 into an annular conduit 76 surrounding the bush bottom 18. From there, the brake fluid passes out of the piston pump 10 through an outlet bore, which is mounted radially in the pump housing 18 and which is located outside the section plane and is consequently not visible. An inlet bore, which radially pierces the pump housing 80 and the bush 16 and discharged into the annular conduit 124 surrounding the valve seat part 96, is likewise located outside the section plane and is consequently not visible.

In the piston pump 10 shown in FIG. 2, both the inlet valve and the outlet valve 38, 64, respectively, are disposed coaxially on the bush 16. This has the advantage that the valve seats 114, 120 can be produced with greater precision than can eccentrically disposed valve seats.

The pole tube 90 of the pump motor is extended past the pump housing 80 and is reshaped, on a side of the pump housing 80 remote from the pump motor, into a radially inward-pointing flange 126. The pole tube 90 of the pump motor, which fits over the four piston pumps 10 of the pump unit 82 on the side of the closure caps 70, fixes the piston pumps 10 in the pump housing 80, so that a calking 72 as shown in the drawing, or the like, can be dispensed with. The result is a compact pump unit 82 with four piston pumps 10; more than the four piston pumps 10 are also possible, again in a star-shaped arrangement.

The use of the valve seat part 96 inserted into the bush 16 has the advantage that the piston restoring spring 36 does not serve to hold the inlet valve 38; instead, the piston restoring spring 36 of the piston pump shown in FIG. 2 serves the sole purpose of restoring the piston 10, or in other words serves to keep the piston 20 in contact with the circumference of the eccentric element.

The foregoing relates to preferred exemplary embodiments of the invention, it being understood that other variants and embodiments thereof are possible within the spirit and scope of the invention, the latter being defined by the appended claims.

We claim:

1. A piston pump for a vehicle brake system, having a housing, into which a bush is inserted, and in the bush a piston that can be driven to execute a reciprocating stroke motion is received axially displaceably, a first check valve (64), which is mounted on the bush and controls a flow direction of fluid, pumped through the piston pump, by the piston pump, the first check valve (64) has a first valve seat (62,120),the piston pump (10) has a second check valve (38), which is disposed in the bush (16) and controls the flow direction of fluid, pumped through the piston pump (10) by the piston pump (10),the second check valve (38) has a second valve seat (42,102),the first valve seat (62,120) is associated with the bush (16) in a stationary manner, and the second valve seat (42,102) is associated with the bush (16) in a stationary manner.

2. The piston pump according to claim 1, in which at least one of the first and second valve seats (62,120,42,102) is disposed on a bush bottom (18) of the bush (16).

3. The piston pump according to claim 1, in which the first and second valves (38, 64) are disposed coaxially with the bush (16).

4. The piston pump according to claim 1, in which the bush (16) has a bush bottom (18) on which the first valve seat (120) for the first valve (64) is mounted, and that a valve seat part (96) is inserted into the bush (16), and that the second valve seat (102) is at the valve seat part (96).

5. The piston pump according to claim 1, in which at least one of the first and second valves (38, 64) is a check valve.

6. The piston pump according to claim 1, in which the pump housing (10) has a fluid bore (58) for delivering or draining fluid to be pumped; that the piston pump (10) has a rotationally drivable eccentric element (34) for driving the piston to execute its reciprocating stroke motion, which element is disposed on an open face end of the bush (16); and that the bush (16) has an annular sealing face (92), with which the bush rests sealingly between the fluid bore (58) and the eccentric element (34) on the pump housing (12).

7. The piston pump according to claim 1, in which the bush (16) is of plastic.

8. The piston pump according to claim 1, in which the piston (20) has a cylindrical shape.

9. The piston pump according to claim 1, in which a plurality of piston pumps (10) is disposed approximately radially on one face end of a pump motor and inside a tube (90) forming a motor housing.

10. The piston pump according to claim 9, in which a plurality of piston pumps (10) are disposed approximately radially on one face end of the pump motor and inside the tube (90) forming the motor housing.

11. The piston pump according to claim 1, in which the first valve (64) has a first closing body (66), the second valve (38) has a second closing body (44, 104), the first closing body (66) is pressed against the first valve seat (62, 120), and the second closing body (44, 104) is pressed against the second valve seat (42, 102).

* * * * *